(No Model.) 2 Sheets—Sheet 2.

E. D. EATON
SUPPORTING DEVICE FOR BICYCLES.

No. 515,664. Patented Feb. 27, 1894.

Witnesses:
J. D. Garfield
J. Bordiker

Inventor:
Edwin D. Eaton
per Chapin & Co.
Attorneys.

UNITED STATES PATENT OFFICE.

EDWIN D. EATON, OF FAIRFIELD, MASSACHUSETTS.

SUPPORTING DEVICE FOR BICYCLES.

SPECIFICATION forming part of Letters Patent No. 515,664, dated February 27, 1894.

Application filed September 29, 1893. Serial No. 486,764. (No model.)

*To all whom it may concern:*

Be it known that I, EDWIN D. EATON, a citizen of the United States of America, residing at Fairfield, in the town of Russell, county of Hampden, and State of Massachusetts, have invented new and useful Improvements in Supporting Devices for Bicycles, of which the following is a specification.

The present improved stand for a bicycle is designed as a permanent attachment to the machine, the object being to produce a device which is so light and convenient in its arrangement as to constitute no incumbrance, and so readily operated that the supporting member may be moved down at pleasure and easily confined in its supporting bicycle position, or, on the other hand, elevated and so held from its supporting position, when desired to ride the vehicle.

The invention consists in the construction and combination of parts substantially as will be hereinafter described and pointed out in the claim.

The device is fully and clearly illustrated in the accompanying drawings, in which—

Figure 1:
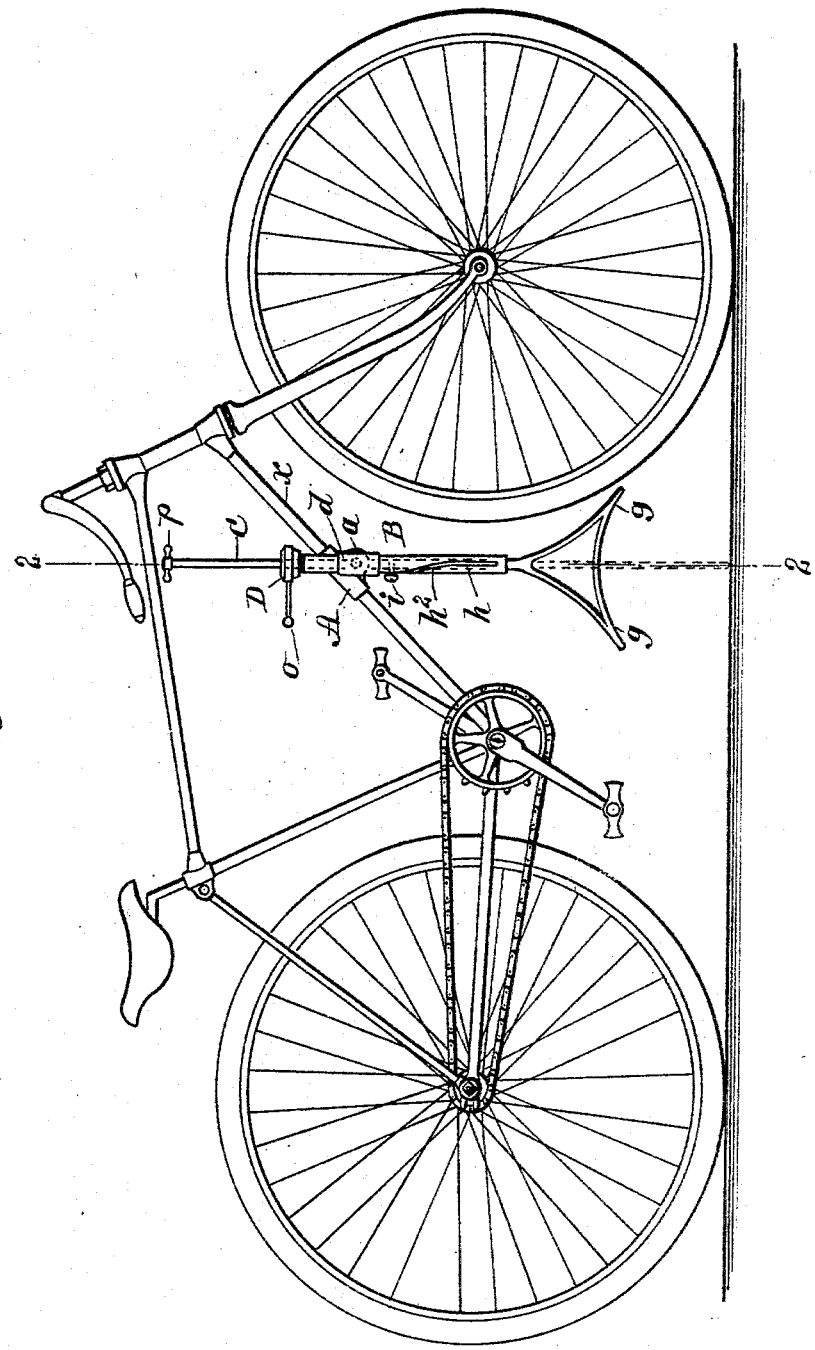
Figure 2:
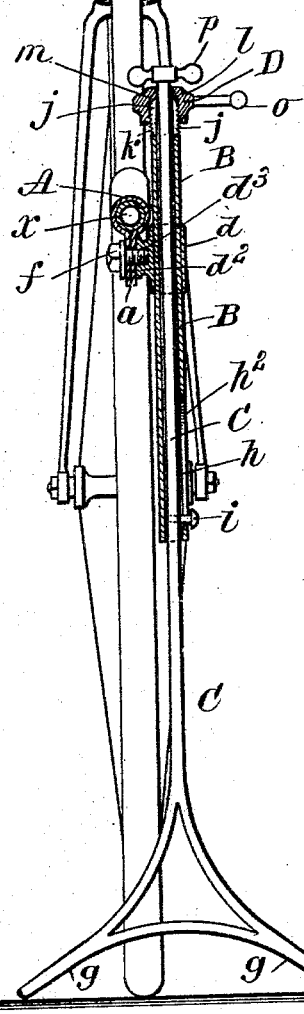
Figure 3:
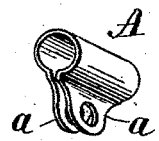
Figure 4:
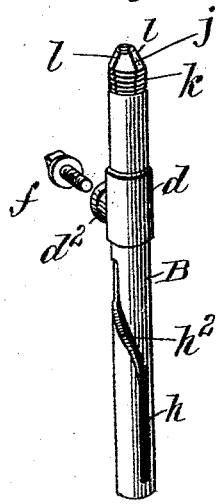

Figure 1 is a side elevation of a safety bicycle with the supporting attachment thereon, the latter being shown as held in its elevated or non-supporting disposition, as necessary while the machine is being ridden. Fig. 2 is a vertical sectional view taken across an intermediate part of the framing of the machine and centrally and longitudinally through the supporting attachment, the supporting member proper being shown as held in its lowered and supporting position. Fig. 3 is a perspective view of the attachment clip and Fig. 4 is a perspective view of the guide-tube.

Similar letters of reference indicate corresponding parts in all of the views.

A represents the attachment clip which is in the form of a split collar with the adjacent perforated ear-pieces, $a, a$.

B represents the guide-tube which is surrounded by the attached collar, $d$, having the laterally extended hub or boss, $d^2$, with the screw-threaded hole, $d^3$.

The clip surrounds the lower forward diagonal frame member, $x$,—or other suitable frame member, according to the style of frame with which the bicycle is equipped,—the confining constriction and support of the tube both being insured by the headed screw, $f$, which passes through the apertured ear-pieces and with a screw engagement with the screw-tapped hole in the boss at the side of the vertical guide-tube.

C represents the support-rod which plays longitudinally within and through the guide-tube it having at its bottom the oppositely extended and suitably formed bearing members or feet, $g, g$. The guide-tube has through its side a slot, $h$, which, while extending a considerable portion of the length of the tube, has a gradual spiral inclination, as seen at $h^2$, while the rod has the stud, $i$, extending outwardly therefrom through, and impinging against the boundaries of, the slot so that in descending the rod has a rotative movement to the extent of a quarter of a turn. It will be seen that the lower portion of the said slot against which the letter, $h$, is placed, is longitudinal of the tube and non-spiral while the spiral portion is above such non-spiral portion. By this formation the rod, C, in its descent, has its quarter turn before moving entirely down so that it will certainly be in its bicycle-supporting position, with the feet, $g$, $g$, transverse, on all occasions,—inequalities in the ground being immaterial. The upper extremity of the guide-tube is longitudinally split, as at $j$,—to be contractible—exteriorly screw-threaded as at $k$, and tapered as at $l$.

D represents a grip-nut having the internal tapered or contracted formation, as seen at $m$, so that on screw-engaging the threaded upper end of the tube it will exert a contracting impingement upon the split tube to constrict it about the rod and hold it in either its elevated or its lowered position.

When the machine is to be ridden and the support-rod is held elevated, the foot-bearing points are longitudinal with the machine, as indicated in Fig. 1, but when the grip-nut is partially unscrewed and the rod permitted to fall, it automatically makes a quarter of a turn bringing the foot-bearing points transversely, as seen in Fig. 2.

The grip-nut may have the lever handle extension, $o$, to facilitate turning it, and the support-rod may have the cross-head, $p$, at its upper end for convenience in raising the rod.

Having thus described my invention, what I claim, and desire to secure by Letters Patent, is—

The combination with the constriction clip for an encircling connection upon a rigid bar or member of the bicycle frame, a collar with a laterally extended hub, and the constricting screw which passes through the ear-pieces of the clip and into said hub, and the tube which, intermediately of its length, is surrounded by and confined within said collar and which has the spirally inclined slot, of the rod which is longitudinally and rotatively movable in and through said tube with the oppositely extended bearing points or feet, and means for temporarily confining the rod against movement, substantially as described.

EDWIN D. EATON.

Witnesses:
WM. S. BELLOWS,
K. I. CLEMONS.